US011783125B2

(12) United States Patent
Adcock et al.

(10) Patent No.: US 11,783,125 B2
(45) Date of Patent: Oct. 10, 2023

(54) SYSTEM AND METHOD FOR ELECTRONIC TEXT ANALYSIS AND CONTEXTUAL FEEDBACK

(71) Applicant: Capital One Services, LLC, McLean, VA (US)

(72) Inventors: Lee Adcock, Midlothian, VA (US); Nahid Ghalaty, Fairfax, VA (US); Ana Cruz, Arlington, VA (US); Geeta Shyamala, Herndon, VA (US); Patrick Sofo, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/963,779

(22) Filed: Oct. 11, 2022

(65) Prior Publication Data

US 2023/0030957 A1 Feb. 2, 2023

Related U.S. Application Data

(63) Continuation of application No. 16/884,399, filed on May 27, 2020, now Pat. No. 11,487,936.

(51) Int. Cl.
*G06F 40/205* (2020.01)
*G06N 20/00* (2019.01)
*G06F 40/35* (2020.01)
*G06F 40/289* (2020.01)

(52) U.S. Cl.
CPC .......... *G06F 40/205* (2020.01); *G06F 40/289* (2020.01); *G06F 40/35* (2020.01); *G06N 20/00* (2019.01)

(58) Field of Classification Search
CPC ...... G06F 40/205; G06F 40/289; G06F 40/35; G06F 40/30
See application file for complete search history.

(56) References Cited

U.S. PATENT DOCUMENTS

| 7,369,985 | B2 * | 5/2008 | Polanyi | G06F 40/253 |
| | | | | 704/8 |
| 7,801,724 | B2 * | 9/2010 | Shaw | G06F 21/316 |
| | | | | 704/10 |
| 7,953,814 | B1 * | 5/2011 | Chasin | H04L 51/212 |
| | | | | 726/25 |
| 8,473,443 | B2 * | 6/2013 | Lewis | G06Q 10/107 |
| | | | | 706/54 |
| 8,510,098 | B2 * | 8/2013 | Spears | G06F 40/40 |
| | | | | 704/270.1 |
| 8,818,788 | B1 * | 8/2014 | Mihalik | G06F 40/30 |
| | | | | 705/26.7 |
| 9,336,268 | B1 * | 5/2016 | Moudy | G06F 40/30 |
| 9,367,537 | B2 * | 6/2016 | Dua | G06F 40/30 |
| 9,460,082 | B2 * | 10/2016 | O'Sullivan | H04L 51/063 |
| 9,716,599 | B1 * | 7/2017 | Gates | H04L 51/00 |
| 9,940,307 | B2 * | 4/2018 | Demiralp | G06F 16/00 |
| 10,037,491 | B1 * | 7/2018 | Fang | G06F 21/6218 |

(Continued)

*Primary Examiner* — Anne L Thomas-Homescu
(74) *Attorney, Agent, or Firm* — Perkins Coie LLP

(57) ABSTRACT

Analyzing communications to determine appropriateness and provide recommendations based on prior communications. Prior communications may create a baseline tone based on the sentiment, words, or phrases used in previous communications between the user and the intended recipient and/or other user recipient pairs. Machine learning techniques may be used to continuously update a baseline tone.

20 Claims, 8 Drawing Sheets

(56) References Cited

U.S. PATENT DOCUMENTS

| | | | |
|---|---|---|---|
| 10,275,535 B1* | 4/2019 | Trauth | G06F 16/24556 |
| 10,382,367 B2* | 8/2019 | Pappu | H04L 51/02 |
| 10,594,757 B1* | 3/2020 | Shevchenko | G10L 15/197 |
| 10,735,592 B1* | 8/2020 | Liu | G10L 15/26 |
| 10,990,759 B1* | 4/2021 | Sosonkin | H04L 9/3239 |
| 10,990,760 B1* | 4/2021 | Monnett | G06F 40/295 |
| 11,064,072 B1* | 7/2021 | Sawala | H04M 3/2281 |
| 11,120,226 B1* | 9/2021 | Nudd | G16H 80/00 |
| 11,575,791 B1* | 2/2023 | Arsanjani | H04M 3/42221 |
| 2004/0158454 A1* | 8/2004 | Polanyi | G06F 40/253 |
| | | | 704/4 |
| 2008/0133221 A1* | 6/2008 | Smith | G06F 40/258 |
| | | | 704/9 |
| 2009/0157389 A1* | 6/2009 | Shaw | G06F 40/279 |
| | | | 704/9 |
| 2009/0187559 A1* | 7/2009 | Gloor | G06F 16/951 |
| | | | 707/999.005 |
| 2009/0248399 A1* | 10/2009 | Au | G06F 40/237 |
| | | | 704/9 |
| 2010/0145940 A1* | 6/2010 | Chen | G06F 16/951 |
| | | | 707/E17.014 |
| 2010/0268682 A1* | 10/2010 | Lewis | G06Q 10/107 |
| | | | 706/54 |
| 2010/0312769 A1* | 12/2010 | Bailey | H04L 51/52 |
| | | | 707/769 |
| 2010/0332287 A1* | 12/2010 | Gates | G06Q 30/02 |
| | | | 379/265.09 |
| 2011/0137906 A1* | 6/2011 | Cai | G06F 40/30 |
| | | | 707/750 |
| 2011/0191097 A1* | 8/2011 | Spears | G06F 16/9535 |
| | | | 704/9 |
| 2013/0103623 A1* | 4/2013 | Burstein | G06F 40/237 |
| | | | 706/12 |
| 2013/0304452 A1* | 11/2013 | O'Sullivan | G06F 40/169 |
| | | | 704/2 |
| 2015/0032724 A1* | 1/2015 | Thirugnanasundaram | |
| | | | G06Q 10/10 |
| | | | 707/722 |
| 2015/0032738 A1* | 1/2015 | Nachnani | G06F 16/38 |
| | | | 707/723 |
| 2015/0278175 A1* | 10/2015 | Dua | G06F 40/40 |
| | | | 704/9 |
| 2015/0293901 A1* | 10/2015 | Bute, III | G06F 16/90324 |
| | | | 707/725 |
| 2016/0019915 A1* | 1/2016 | Khan | G10L 19/018 |
| | | | 704/239 |
| 2016/0063121 A1* | 3/2016 | Agarwal | G06F 16/24578 |
| | | | 707/706 |
| 2016/0072902 A1* | 3/2016 | Chakra | G06F 16/337 |
| | | | 709/206 |
| 2016/0232137 A1* | 8/2016 | Liu | G06F 40/14 |
| 2016/0240213 A1* | 8/2016 | Wen | G10L 25/63 |
| 2017/0004455 A1* | 1/2017 | Tang | G06N 20/00 |
| 2017/0272401 A1* | 9/2017 | Brockington | G06F 16/24578 |
| 2017/0339083 A1* | 11/2017 | Pinel | G06F 40/253 |
| 2018/0018581 A1* | 1/2018 | Cook | G06N 20/00 |
| 2018/0068226 A1* | 3/2018 | O'Connor | G06F 40/35 |
| 2018/0081873 A1* | 3/2018 | Carmena | G06F 40/253 |
| 2018/0218335 A1* | 8/2018 | Jenkins | H04L 67/535 |
| 2018/0248746 A1* | 8/2018 | Deluca | H04L 51/046 |
| 2019/0026264 A1* | 1/2019 | Oshima | G06F 16/316 |
| 2019/0065464 A1* | 2/2019 | Finley | G06N 3/044 |
| 2019/0065610 A1* | 2/2019 | Singh | H04L 51/52 |
| 2019/0121842 A1* | 4/2019 | Catalano | G06F 40/247 |
| 2019/0205473 A1* | 7/2019 | Socol | G06F 16/353 |
| 2019/0243925 A1* | 8/2019 | Baughman | G06N 10/00 |
| 2019/0318004 A1* | 10/2019 | Rohatgi | G06F 16/93 |
| 2020/0026761 A1* | 1/2020 | Kamijoh | G06F 40/253 |
| 2020/0053035 A1* | 2/2020 | Mukherjee | G06N 5/046 |
| 2020/0059375 A1* | 2/2020 | Hewitt | G06F 40/30 |
| 2020/0104417 A1* | 4/2020 | Fox | G06F 16/951 |
| 2020/0139077 A1* | 5/2020 | Biradar | G10L 25/63 |
| 2020/0301983 A1* | 9/2020 | Mishra | G06F 40/30 |
| 2020/0311776 A1* | 10/2020 | Mehrotra | G06F 40/253 |
| 2020/0401766 A1* | 12/2020 | Brinig | G06Q 10/107 |
| 2020/0403956 A1* | 12/2020 | Adamski | H04L 51/52 |
| 2021/0004706 A1* | 1/2021 | Riddle | G06Q 10/10 |
| 2021/0097240 A1* | 4/2021 | Singh | G06F 40/253 |
| 2021/0165842 A1* | 6/2021 | Segal | H04L 51/52 |
| 2021/0209306 A1* | 7/2021 | Kvochko | G06F 40/30 |
| 2021/0240774 A1* | 8/2021 | Bikumala | G06N 3/08 |
| 2021/0264438 A1* | 8/2021 | Singh | G06Q 10/20 |
| 2022/0084151 A1* | 3/2022 | Tripathi | G06Q 50/01 |

* cited by examiner

SYSTEM AND METHOD FOR ELECTRONIC TEXT ANALYSIS AND CONTEXTUAL FEEDBACK

CROSS-REFERENCE TO RELATED APPLICATIONS

This application is a continuation of U.S. patent application Ser. No. 16/884,399, filed on May 27, 2020. The content of the foregoing application is incorporated herein in its entirety by reference.

BACKGROUND

1. Technical Field

The present disclosure relates to a system and method for automatically analyzing text in an electronic document, and providing contextual feedback on content sentiment.

2. Introduction

Emails are a prevalent means for individuals to communicate both professionally and personally. The tone that is appropriate for an email may differ depending on the subject of the email and sender and recipient of the email. In the professional context, an email that is appropriate for a peer may not be appropriate for a superior, even if the information contained in the email is the same. Similarly, an email may not be appropriate if the subject of the email is serious even if the email would be appropriate if the email was regarding a less important subject. Given the large number of electronic documents that are created and stored, the tone and content of electronic documents cannot be tracked or analyzed. Therefore, it may be advantageous to automatically generate text or suggestions based on several factors including the sender's email history and habits, the recipient of the email, or the subject of the email. It may be further advantageous to automatically provide text suggestions or the tone of the email before the email is sent. Machine learning may provide an advantageous way to evaluate the appropriateness of email tone based on a sender's or group of senders' email tone history and the responses received by recipients of emails with given tones.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. Disclosed are systems, methods, and non-transitory computer-readable storage media a technical solution to the technical problem described. A system, comprising: a word database containing words associated with a tone category; a recipient database configured to: store a baseline tone of electronic documents from a sender; and associate the baseline tone with a recipient of the electronic documents; a content analyzer configured to: retrieve a passage in an electronic document generated in an application; determine the sender and the recipient of the electronic document; retrieve the baseline tone of the sender from the recipient database; retrieve words associated with the tone category from the word database; parse the passage for words associated with the tone category; identify a tone of the passage based on the words in the passage associated with the tone category; compare an identified tone to the baseline tone; determine whether the tone is consistent with the baseline tone; determine an inconsistency classification when the tone is not consistent with the baseline tone; and output the inconsistency classification.

A method comprising: identifying a passage in electronic documents; identifying a first party in the electronic documents; identifying a first party classification based on the first party; identifying a first subject of the electronic documents; parsing the passage to detect a number of words that correspond with a sentiment category; assigning the passage a first sentiment score based on the number of words in the sentiment category; updating a sentiment machine learning algorithm based on the first sentiment score; updating a party machine learning algorithm based on the first sentiment score and the first party; updating a party classification machine learning algorithm based on the first sentiment score and the first party; updating a subject machine learning algorithm based on the first sentiment score and the first subject; electronically displaying a new electronic document; identifying a second party to the new electronic document; identifying a second party classification based on second the party; identifying a second subject of the new electronic document; retrieving text typed into the new electronic document; parsing the text typed into the new electronic document to detect the number of words that correspond with the sentiment category; assigning the text typed into the new electronic document a second sentiment score based on the number of words in the sentiment category; retrieving the sentiment machine learning algorithm; using the sentiment machine learning algorithm to generate a sentiment correlation based on the second sentiment score; providing a notification when the sentiment correlation is below a threshold; using the party machine learning algorithm to generate a party correlation based on the second sentiment score when the first party corresponds with the second party; providing the notification to an application when the party correlation is below the threshold; using the party classification machine learning algorithm to determine a party classification correlation based on the second sentiment score when the first party classification corresponds with the second party classification; providing the notification to the application when the party classification correlation is below the threshold; using the subject machine learning algorithm to determine a subject correlation based on the second sentiment score when the first subject corresponds with the second subject; and providing the notification when the subject correlation is below the threshold.

A system comprising: a content identifier configured to: receive content from an electronic communication application; a sentiment analyzer configured to: extract a word from the content of an electronic communication; assign the word a sentiment category; assign the word in the sentiment category a score; and generate a communication sentiment score based on the score of the word; a party analyzer configured to: receive a party to the electronic communication created by the electronic communication application; receive a party sentiment score for the party from a database; compare the party sentiment score to the communication sentiment score; and determine a party deviation between the party sentiment score and the communication sentiment score; a job-title analyzer configured to: receive the party to the electronic communication created by the electronic communication application; identify a job-title of the party to the electronic communication; receive a job-title sentiment score for the job-title from the database; compare the job-title sentiment score to the communication sentiment score; and determine a job-title deviation between the job-title sentiment score and the communication sentiment score; a warning generator configure to: provide a warning to the electronic communication application when the party deviation is greater than a first threshold; and provide the warning to the electronic communication application when the job-title deviation is greater than a second threshold; and a learning generator configured to: update the party sentiment score for the party based on the communication sentiment score; commit the party sentiment score to the database; update the job-title sentiment score for the job-title based on the communication sentiment score; and commit the job-title sentiment score to the database.

DETAILED DESCRIPTION

Figure 1:
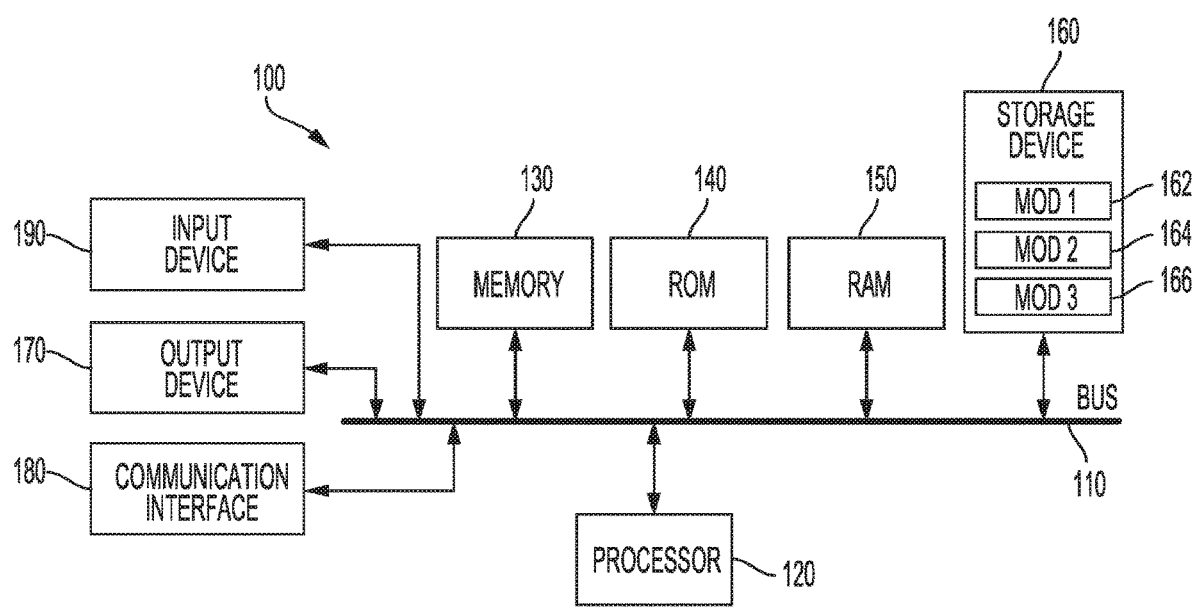
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media for natural language processing and analysis of electronic documents. The analysis may determine the tone and sentiment of the electronic document, such as an email.

It is therefore advantageous to automatically evaluate the text of an email and provide suggested text or feedback on the appropriateness of the email tone, sentiment, and content before the email is sent. In other embodiments, the analysis may determine the email tone, sentiment, and content of the document. The analysis of the electronic document may be performed by a tone interpreter or a content analyzer. A recipient database may store the baseline tone of electronic documents from a sender and associate the baseline tone with a recipient of the electronic documents. The email sentiment, tone, and content may be evaluated using natural language processing. The natural language processing may be rule based or machine learning based. The email may be processed, and several categories may be assigned to the email. In other embodiments, the categories may be assigned to words or passages within the email. A word database may contain words, phrases, and punctuation that are associated with different tone or sentiment categories. The categories may be tone or sentiment categories such as passive, aggressive, informal, angry, sentimental, dismissive, serious, personal, professional, confidential, etc. In some embodiments, the tone may be associated with a recipient or a sender-recipient pair. The tone score for the recipient or sender-recipient pair may be stored in the recipient database. In other embodiments, the sender and recipient may be assigned categories and the tone may be associated with the sender-recipient category pair.

Several emails may be analyzed to create a baseline tone between recipients or recipient types. The recipient type may be determined by a job-title analyzer, or a party analyzer based on information input into the electronic document or the user account. The baseline tone may change over time using machine learning techniques. For example, the machine learning techniques may include Linear Regression, Logistic Regression, Decision Tree, SVM (Support Vector Machine), Naive Bayes, kNN (k—Nearest Neighbors), K-Means, Random Forest, Dimensionality Reduction Algorithms, Gradient Boosting Algorithms, XGBoost, LightGBM, and/or Catboost algorithms. In some embodiments, the baseline tone may also be associated with the content or subject of the emails. The content or subject may be determined using natural language processing, key words, or may be identified by a user. In other embodiments, a baseline tone may be pre-determined for certain sender-recipient pairs or the email content and categories. In still further embodiments, the tone of the response email may also be evaluated in a tone interpreter, and the response tone may be used in determining the effectiveness of the tone of the initial email to better inform the machine learning algorithm. The baseline tone may be stored in a database and associated with the author(s), recipient(s), or author(s)/recipient(s)

A sender may author new emails. The new email's tone, content, and sentiment may be analyzed in a tone interpreter, content analyzer, or content identifier and may be compared to the baseline tone. The tone analyzer may review the email to determine whether the email has a tone that may be inappropriate, the tone identifier may compare the contents of the email to words or phrases that may be identified as corresponding to a tone category. The content analyzer may determine if the overall content of the email. For example, natural language or other processing methods may be used to determine whether the content of the email pertains to a bill, a contract negotiation, and personnel discussion, etc. The content identifier may identify the presence of any specific content of the email, for example, if a specific client is mention, the content identifier may identify the client as content of the email. Some embodiments may combine a tone interpreter, and content analyzer, and a content identifier into a single processing object that performs each of the task of the tone identifier, content analyzer, and content identifier. If the new email is found to differ from the baseline tone, a notification may be provided to the sender by a warning generator. The notification may highlight the passages that differ from the baseline sentiment or tone. Determining a sentiment or tone may be done by assigning the email or passage a sentiment or tone score. In embodiments where the email is categorized in its entirety, the warning generator may generate a pop-up message or meter that indicates tone. In embodiments where a meter is used to display the sentiment, tone, or score, the meter may be for an individual tone category. In some embodiments multiple meters may be displayed. For example, an aggressiveness meter and a formality meter may separately be displayed. In still further embodiments, one or more meters may be a combination of different categories. In other embodiments, the tone may be evaluated and the category that the email, word, or passage falls into may be identified to the user by highlighting, underlining, or a pop-up message. In still further embodiments, alternative language or phrasing may be provided that is consistent with the baseline tone.

In some embodiments a tone identifier and content identifier may be used alone or in combination with the tone interpreter or content analyzer. In embodiments utilizing a tone identifier or content identifier, certain words or phrases may the pre-determined as corresponding to a certain tone or content category. In these embodiments, the tone or content identifier may flag or designate an email, word, or passage as belonging to a tone of content category when the word or passage is present.

Emails are a predominant form of communication in professional environments. Often the tone or sentiment of the email can be as important as the content of the email. For example, an aggressive or unprofessional tone may obscure or detract from an email where the content would otherwise be acceptable to the recipient. Additionally, the sentiment, tone, and formality of an email may differ depending on the relationship between the sender and recipient(s). For example, a sender communicating with a peer may use a more casual tone than the sender would when dealing with a superior or a client. It may be difficult for a sender to maintain the appropriate tone when sending multiple emails to multiple recipients in a short period of time. Additionally, a sender may have personal thoughts or opinions about the subject of an email or the recipient, however, it may not be appropriate for the sender's personal thoughts or opinions to be reflected in the email. The thoughts, feelings, or emotions of the sender may consciously or subconsciously be reflected by the tone or sentiment of the email.

Email tone or sentiment can be detected by a recipient in ways that may not be immediately apparent to the sender. For example, the word choice, punctuation, capitalization or sentence structure used in an email may create a tone or sentiment perception that is not intended by the sender. Sending an email with an inappropriate tone or sentiment may be detrimental to the sender, recipient, or the business. For example, an unintended tone may cause a recipient to misinterpret the content of the email and take actions based on an interpretation that the sender does not intend. A sender may be harmed if an email is perceived as unprofessional or aggressive which may negatively affect the sender's reputation or may result in a loss of business. Businesses may also be adversely affected when its employees are not effectively communicating due to misinterpretation of tone. Further, inappropriate tone or sentiment in an email may result in liability or public embarrassment for a business as emails are frequently leaked and discovered during litigation. For example, a casual tone when discussing a safety concern may create liability whereas a more serious tone may indicate that the matter was thoughtfully addressed.

Additionally, some email content may be appropriate for some recipients but not others. Confidential client information, for example, must be carefully siloed from other clients or even other members of the business. However, this information may be inappropriately shared by unintentionally naming the wrong recipient. Further, an employee may not be aware that some information is not to be shared with a party and may intentionally share inappropriate information to the detriment of the business's credibility and the client's interest.

With reference to FIG. 1, an exemplary system includes a general-purpose computing device 100, including a processing unit (CPU or processor) 120 and a system bus 110 that couples various system components including the system memory 130 such as read-only memory (ROM) 140 and random access memory (RAM) 150 to the processor 120.

The computing device 100 can include a cache of high-speed memory connected directly with, in close proximity to, or integrated as part of the processor 120. The computing device 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general-purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, system bus 110, an output device 170 that might be a display, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the storage devices 160 that may be a hard disk, other types of computer-readable media which can store data that are accessible by a computer, such as magnetic cassettes, flash memory cards, digital versatile disks, cartridges, random access memories (RAMs) 150, and read-only memory (ROM) 140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Figure 2:
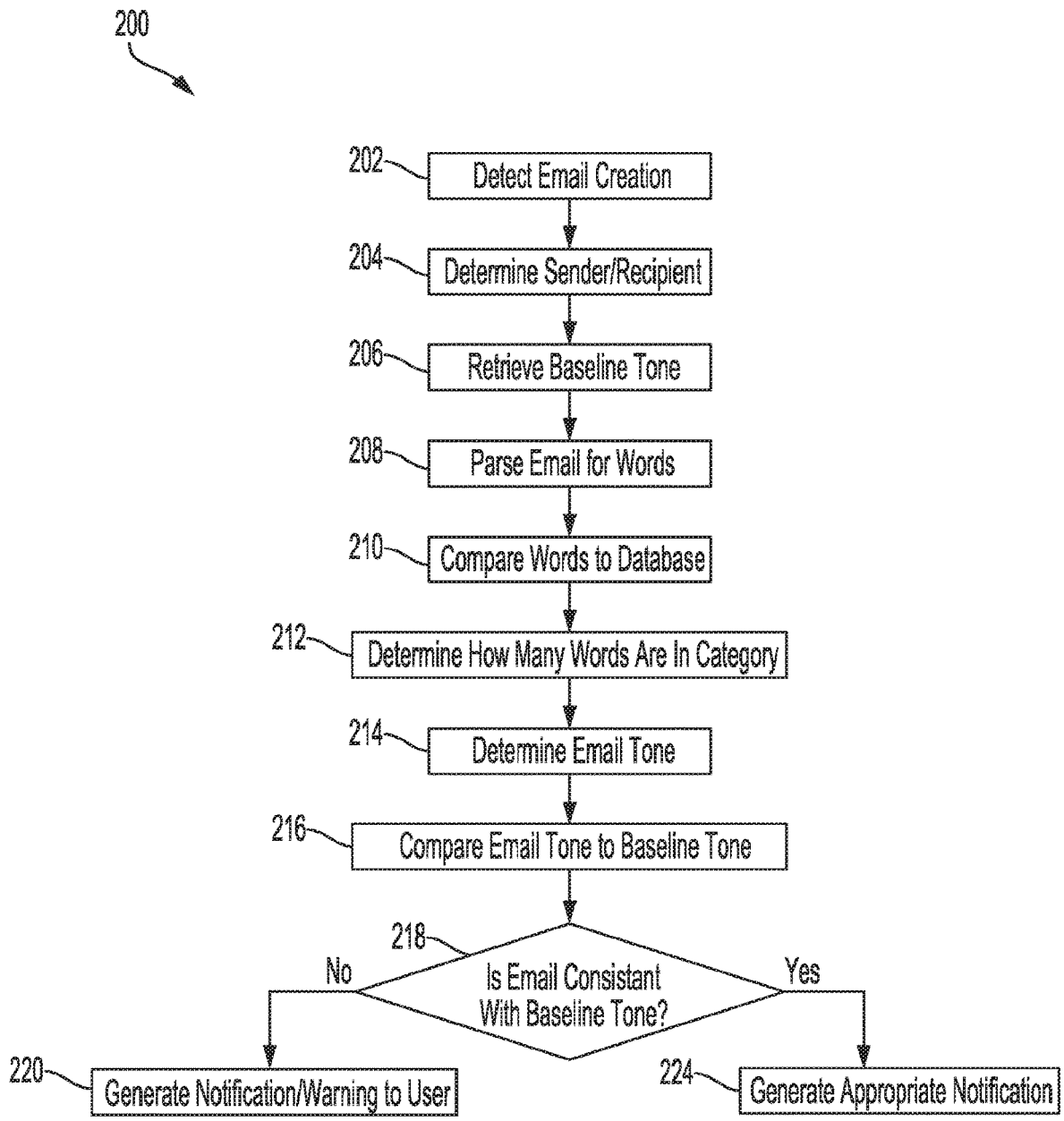
FIG. 2 illustrates an example method embodiment.

FIG. 2 depicts example method 200. At 202 the creation of a new email may be detected. A new email may be detected when an email window is opened or when a reply option is selected on a user device. At 204 the sender and recipient of the email may be determined. The sender may be determined based on the account that is used to send the email. The recipient may be determined based on the name entered into a recipient category in a party analyzer. The party analyzer may receive a party to the electronic communication created by the electronic communication application. The party analyzer may also receive a party sentiment score for the party from a database. The party sentiment score may be a score based on previous emails exchanged by the parties. The party analyzer may then compare the party sentiment score to the communication sentiment score. The party analyzer may determine a party deviation between the party sentiment score and the communication sentiment score.

The job-title of the recipient may be determined in a job-title analyzer. For example, the job-title analyzer may receive the party to the electronic communication created by the electronic communication application The job-title identifier may identify a job-title of the party to the electronic communication, receive a job-title sentiment score for the job-title from the database, then compare the job-title sentiment score to the communication sentiment score and determine a job-title deviation between the job-title sentiment score and the communication sentiment score. The recipient may be auto-populated in some examples, such as when the email is a reply. At 206 a baseline tone for the sender recipient pair may be retrieved. The baseline tone may be based on previous emails. The baseline tone may be specific to the sender-recipient pair or may be determined based on category, job-title, or position of the sender-recipient pair. For example, if the individual sender is a sales person and the individual recipient is a client, a baseline tone for sales person/client may be assigned. In other embodiments the baseline tone may be based on the individual sales person and the individual client. The baseline tone may be stored in a database that may be on the sender's computing device or on a device that may be accessed by the sender's computing device as well as other devices within an organization.

At 208 the email may be parsed by a tone interpreter or tone identifier for words that indicate a tone. In embodiments using a tone interpreter, parsing words may include using machine learning, natural language processing, and parsing full phrases, full sentences, and full paragraphs. The tone interpreter may then determine the overall tone of the email. In embodiments utilizing a tone identifier, the email may be parsed to determine whether specific words or phrases that are associated with a problematic tone are present in the email. In embodiments using a tone identifier, certain words or phrases may be pre-determined as having a problematic tone. Words associated with a tone may be stored in a word database in embodiments using a tone identifier. The word database may be provided, and the text in the document may be compared to the word database by the content identifier or tone identifier. If the email contains words or phrases that are of a problematic category, the word or phrase may be flagged. In other embodiments, the tone identifier may individually assess all words in the email to determine an overall tone. In embodiments, the subject matter may be included in a determination of appropriateness or tone. At 210 the words of the email may be compared to words in a database to determine the tone of the parsed words. In other embodiments the words may be evaluated using an algorithm. In further embodiments, the email may be analyzed in a content analyzer. A baseline tone may be adjusted based on the subject matter of an email or a baseline tone may be assigned based on the subject matter of the email. The subject matter may be based on the content of the email or may be based on an identified subject matter determined based on the content or in the subject line of an email or electronic document, At 212 the number of words in a tone or sentiment category may be determined. In further embodiments, whether any words fall into a given tone category may be determined. The database may store the words and associated categories. Words may be associated with more than one category in the database. Some example categories may include aggressive, passive, neutral, etc.

At 214 the number of words in the given tone categories may be used to determine a current tone. In embodiments using a tone interpreter, the sentiment score may be based on the number of words in a category compared to the total number of words in the email. In other embodiments the tone may be normalized by comparing the score to the total number of words in the email to the number of words in the neutral category. In further examples, if the email contains three (3) words that are in an aggressive tone category and three (3) words that are in a passive tone category, the tone may be determined to be neutral. In embodiments using tone identifier, if there are any words in the aggressive category, the tone may be determined to be aggressive regardless of the presence of other words in other tone categories.

At 216 the email tone may be compared to the baseline tone retrieved at 206. This may be done in a comparison interpreter or by using a tone correlation machine learning algorithm. If the email is consistent with the baseline tone at 218, a notification may be generated at 224 that indicates that the email is appropriate. If the email is not consistent with the baseline tone, a warning generator may generate a warning at 220 that may indicate that the email is not appropriate. The warning generator may provide a warning to the electronic communication application when a deviation is greater than a threshold.

In some embodiments the warning may indicate how the email differs from the baseline tone or sentiment. For example, a warning may indicate that the email is more aggressive, informal, etc., than other emails between the sender recipient-pair or pre-determined appropriate tone. In still further embodiments, the particular words or phrases that are problematic may be identified. For example, problematic words or phrases may be highlighted within the email. In further embodiments, replacement words or phrases that are consistent with the baseline tone may be suggested to the sender. Thus, the sender may be notified of the email tone before the email is sent so that any adjustments to the email may be made before sending.

Figure 3:
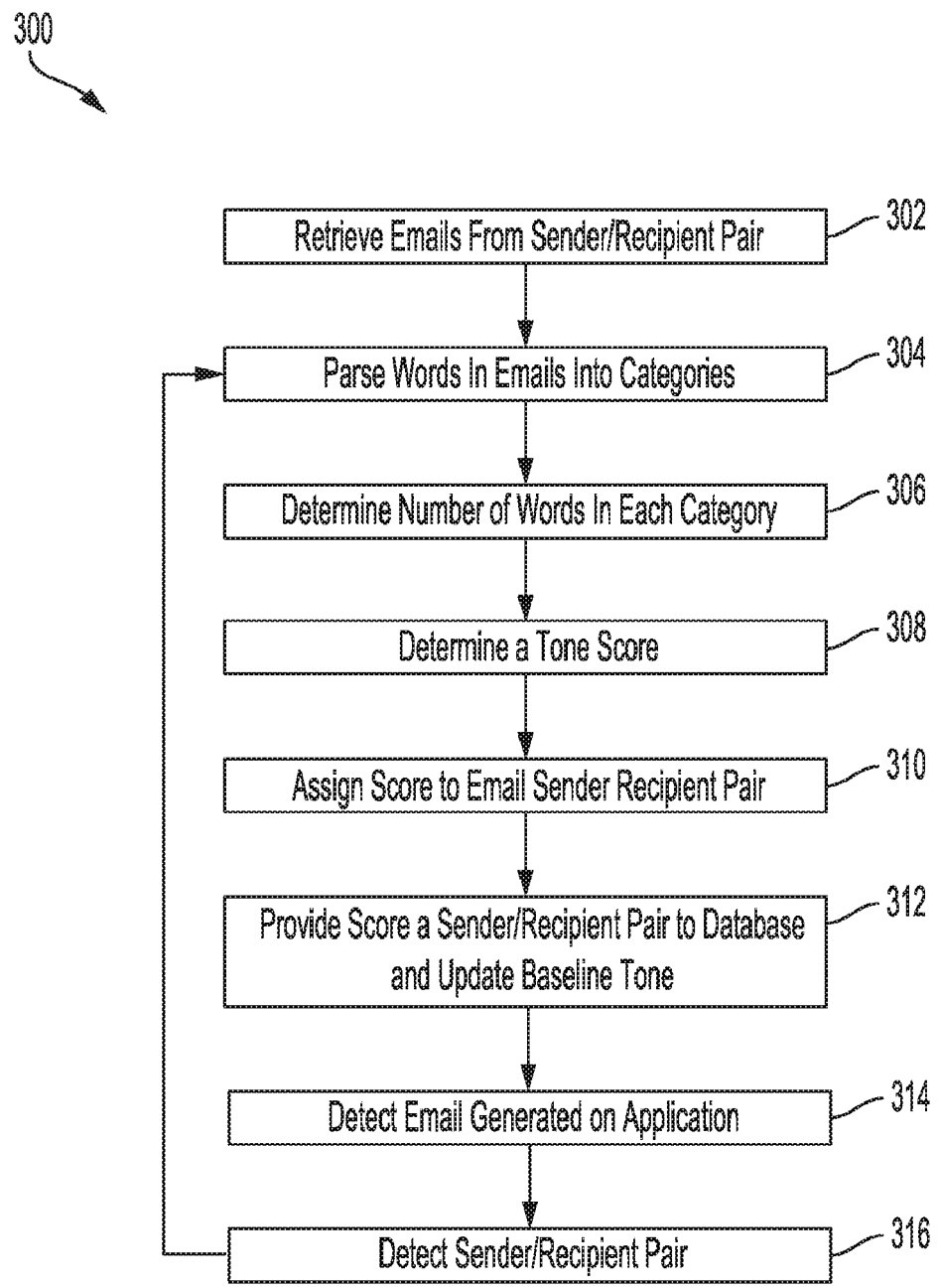
FIG. 3 illustrates an example method embodiment.

FIG. 3 depicts an example method 300. At 302 the emails from a sender-recipient pair may be retrieved. At 304 the words or phrases in the email may be parsed into tone categories. At 306 the number of words that belong to each tone category may be determined. A tone of the email may be determined at 308, this may be based on the number of words in the tone categories in the sender/recipient email pairs. A tone may be based on a single tone category or a tone may be an aggregate based on multiple tone categories. At 310 tone score may be assigned to the sender-recipient pair based on the baseline tone. The tone score and its assigned sender-recipient pair may be provided to the database and the sender-recipient pair baseline tone stored in the database may be updated at 312 based on the tone score. The tone score may be used to update a baseline tone associated with the individual sender-recipient pair or the category of the sender-recipient pair, for example: manager-associate, associate-client, internal-external, manager-manager, etc. The baseline tone may be different for different categories of sender-recipient pairs based on tone of the communications between the pairs in the past. For example, a manager may have a higher level of formality in client emails than in associate emails. In other embodiments, the baseline tone may be set by an individual or an organization so that pairs are given unique tone designations. For example, an organization may set a lower baseline tone for aggressiveness between manager/associate pairs than associate/associate pairs. The baseline tone or tones may be saved to a database to be accessed later and referenced when new emails are generated.

At 314 a new email may be generated by a sender and the email generation may be detected. The sender-recipient pair may be determined at 316. The sender-recipient pair may be detected based on the email address of the sender and recipient, entered by the user, or determined based on the account that the sender or recipient is logged into. The email content may be returned to the step at 304 so that the baseline tone is continuously updated as additional emails are created and sent.

Figure 4:
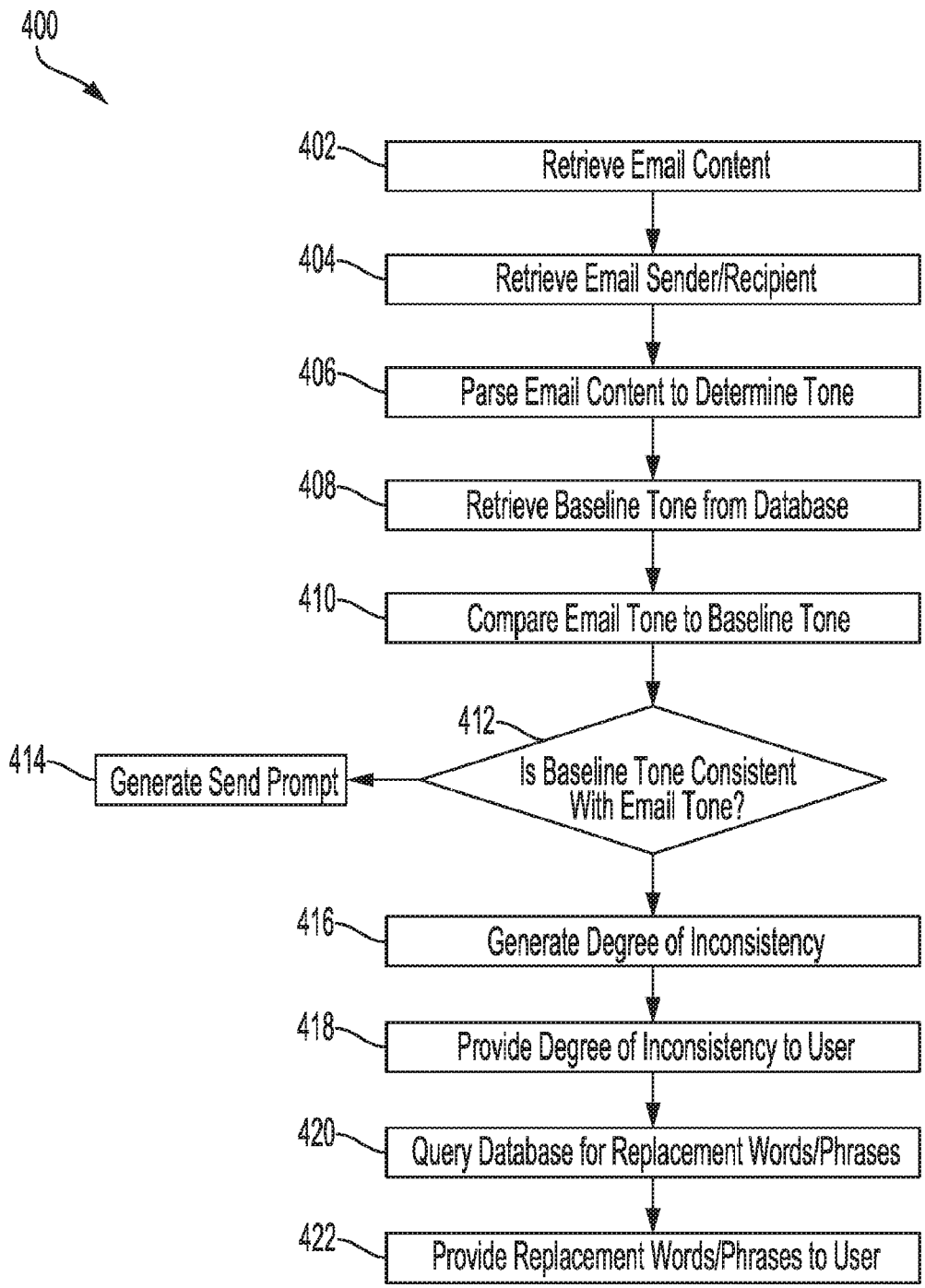
FIG. 4 illustrates an example method embodiment.

FIG. 4 depicts example method 400. At 402 the content of an email may be retrieved. Email content retrieval may be done automatically, initiated by a user selecting a send option or by selecting a tone analysis option. A tone analysis option may be a selectable option that a sender can chose before sending an email. A tone analysis may be provided within an email generation program or application. At 404 the sender-recipient pair may be determined based on the specific sender/recipient or a sender/recipient category that may be based on the relationship between the sender/recipient with each other within an organization. At 406 the content of the email may be parsed to determine the tone of the email. The email tone may be determined using a natural language processor that may be used in combination with a tone identification program or algorithm. At 408 a baseline tone may be retrieved from a database for a sender-recipient pair. The baseline tone may be determined based on prior emails sent between the sender-recipient pair. At 410 the baseline tone may be compared to the tone of the email determined in 406. If the tone of the email is consistent with the baseline tone at 412, an instruction may be sent to a user device to generate a prompt that allows the user device to send the email to the recipient. If the baseline tone is inconsistent with the email tone at 412, the user device may prevent the user from sending the email. In other embodiments, a send prompt may not be provided to the user device and a notification indicating a degree of inconsistency between the email and the baseline tone may be determined at 416.

The level of inconsistency between the email tone and the baseline tone may be evaluated based on a single or multiple tone characteristics. In other embodiments, an aggregate tone based on multiple categories may be determined. For example, if the email tone is determined to be outside of an aggressive tone range, a send prompt may not be provided. In other embodiments, if an email's tone is outside of an aggressive tone range but is within a positivity tone range, the send prompt may be provided at 414.

The level of inconsistency between the email tone and the baseline tone may be provided to the user. The level of inconsistency may be provided for multiple tone categories. In further embodiments, an aggregate tone inconsistency may be provided. At 420 a database or natural language program may provide alternative language that is more consistent with the baseline tone. For example, if the email or a word or phrase within an email is too informal, a more formal version of the word or phrase may be queried. For example, "don't" may be queried and the replacement phrase "do not" may be associated with "don't" in the database. At 422 the replacement word or phrase may be provided to the user device. Alternative language may be provided as a pull-down menu for words or phrases that have been identified as problematic. In other embodiments a user may choose to have replacement words or phrases suggested or inserted into the email.

Figure 5:
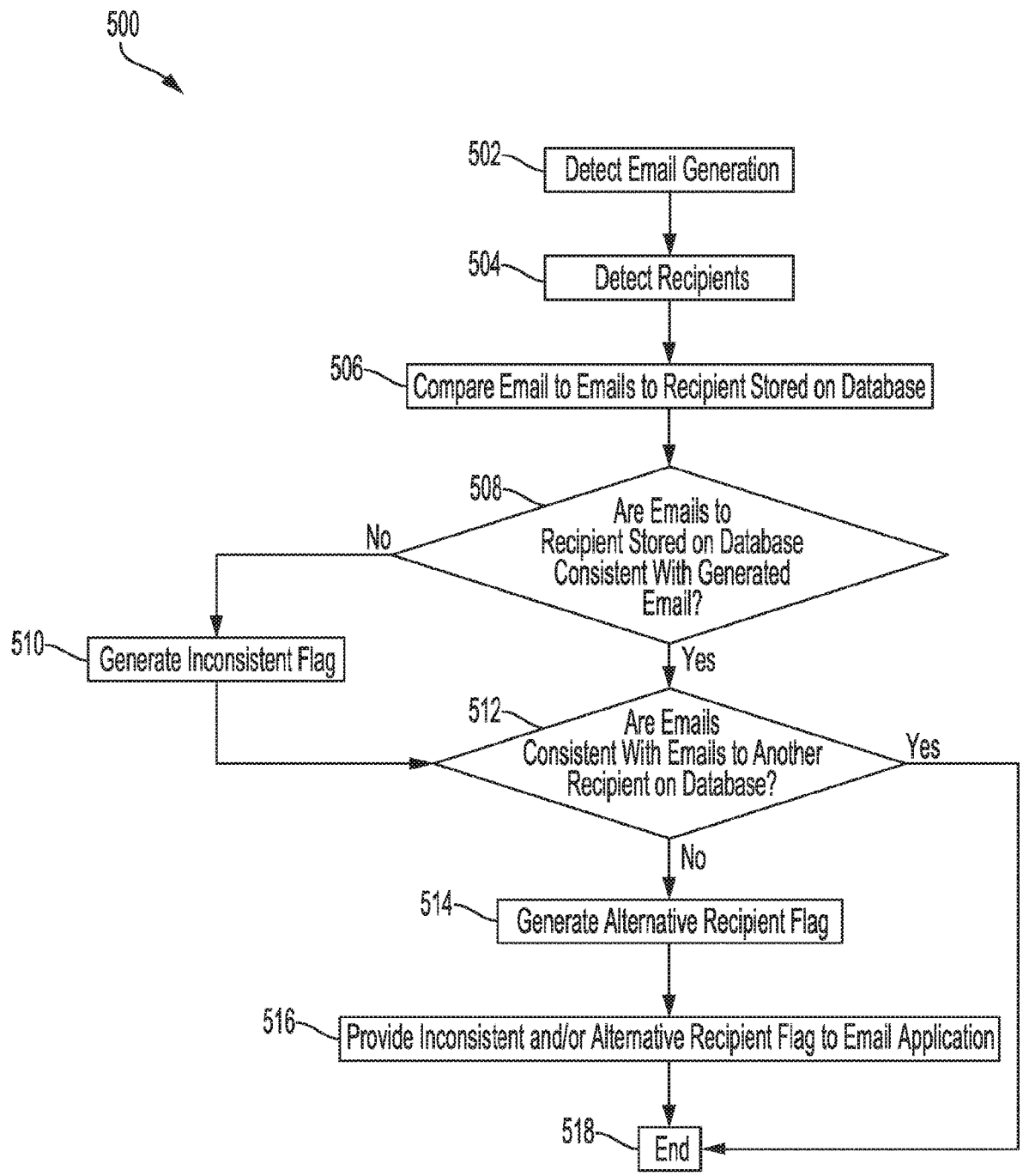
FIG. 5 illustrates an example method embodiment.

FIG. 5 depicts example method 500. At 502 email generation may be detected. At 504 the recipient(s) of the email may be detected. At 506 the content of the email may be compared to other emails to a recipient that may be stored in a database or that may be processed into a program that uses natural language programming to evaluate the generated email for comparison to previous email. At 508 the generated email may be compared to previous emails to determine whether the tone of the generated email is consistent with emails sent to the recipient in the past. This may be done using a tone evaluation technique. In further embodiments this may be done by a content analyzer based on the content of the email. For example, if a generated email mentions a topic that has not been mentioned in previous email, the email may be found to be inconsistent with previous emails at 508. If the content is inconsistent with previous emails, an inconsistency flag may be generated. This may be advantageous if the email includes content that is not intended to be shared with the recipient. For example, if a sender has never sent an email to the recipient that reference a certain subject, entity, or information type, a warning may be generated to the sender that indicates that the indicated recipient may not be the intended recipient of the email. At 512 it may be determined whether an alternative or additional recipient may be consistent with the subject of the generated email. If another recipient is appropriate, an alternative or additional recipient may be generated and a flag indicating the alternative or additional recipient may be generated at 514.

An alternative or additional recipient may be recommended based on the subject, entity, or information type being consistent with another potential recipient. This may be advantageous to prevent unintended recipients from receiving information that might compromise confidentiality and may work to prevent members of an organization from unintentional disclosure of sensitive information. In other embodiments, the tone of the email may differ from emails previously sent to the recipient. A similar notification may be generated to prevent unintended sender tone from being received by an unintended party.

For example, if the generated email includes a reference to a specific account or client that has not previously been referenced in emails to the recipient, alternative recipient who may have had communications consistent with the generated email may be suggested at 514. This may be advantageous to avoid information that is intended for one recipient from being shared with an unintended recipient. If the user selects a send option, a flag or warning may be provided to the user to allow for the user to review the content and/or recipient of the email. The appropriate recipient or content of an email may be determined based on previous emails sent, for example, using machine learning. In other embodiments the appropriate recipient or content of an email may be pre-determined. For example, inappropriate content may be also be pre-programmed by a managing operator in order to prevent errant emails that disclose confidential information.

Figure 6:
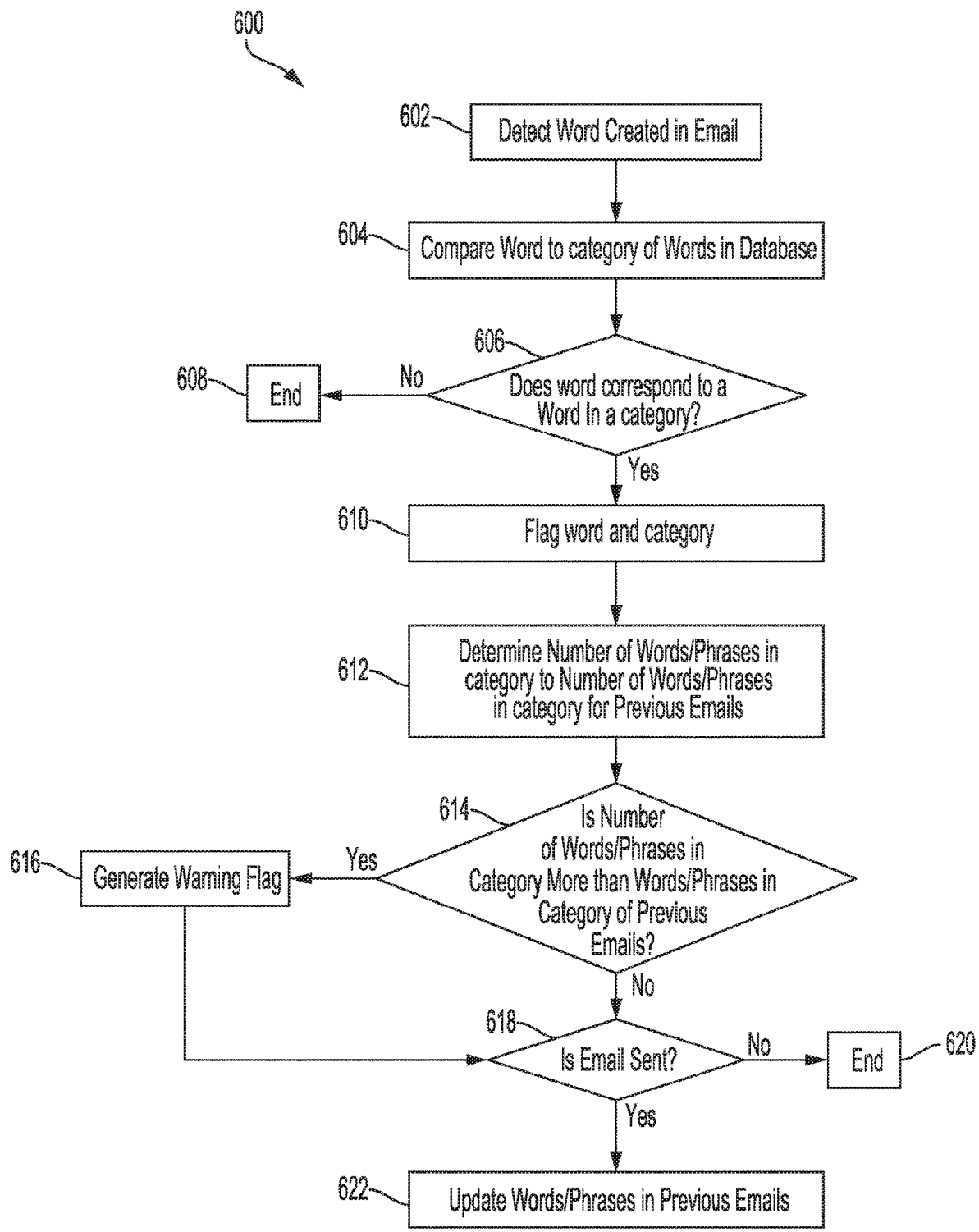
FIG. 6 illustrates an example method embodiment.

FIG. 6 depicts example method 600. At 602 a word may be detected in an email generated by a user device. The word may be determined to be problematic based on words that are entered into an email monitoring program. In other embodiments a word or phrase may be determined to be problematic based on the content of emails that have been previously sent by the sender or the recipient. For example, a word or phrase may be problematic when the word or phrase differs from the words or phrases in previous emails specifically or by category. At 604 the detected word may be compared to words in a database. The database may contain words or phrases that are problematic. For example, words or phrases that may implicate confidential information or words that may indicate an inappropriate tone. If a word or phrase within the email does not correspond to a problematic word or phrase at 606, the method may end at 608. If there are no problematic words or phrases, no tone warning may be provided to the sender. If, at 606, the email is determined to contain a word or phrase in a problematic word or phrase category, the word or phrase category may be flagged at 610. The problematic category may relate to words or phrases that indicate confidential information, are of a problematic tone, inconsistent with the words or phrases in previous emails, or inconsistent with a pre-determined baseline tone. If a word or phrase does correspond to a category that may be deemed inappropriate for the correspondence, a flag may be set to indicate potentially inappropriate content at 610.

At 612 the number of words and phrases in the identified categories may be determined for the entire email. At 614 it may be determined whether the number of words or phrases in a category exceeds the number of words or phrases in the categories of previous emails from the sender. In some embodiments the percentage of words in an email that are in the category may be determined and compared to the normal percentage of words in the category. If the words or phrases in a category exceeds the norm at 614, a warning flag may be generated at 616. The warning flag may be provided to a user device or may prompt the device to perform an action, such as providing additional options to replace words or prevent the email from sending. In other embodiments an alert that the email may contain inappropriate content may be generated. At 618 a sent email may be detected. The email may be sent regardless of whether a flag is set at 616. If the email is not sent, the method may end at 620. If the email is sent, the email may be analyzed at 622. The content of the email may then be used to update the number of words and phrases in a category for previous emails. This may be performed in a learning generator that may utilize machine learning techniques such as Linear Regression, Logistic Regression, Decision Tree, SVM (Support Vector Machine), Naive Bayes, kNN (k—Nearest Neighbors), K-Means, Random Forest, Dimensionality Reduction Algorithms, Gradient Boosting Algorithms, XGBoost, LightGBM, and/or Catboost algorithms.

The database or baseline tone may be continually updated as additional emails are sent.

Figure 7:
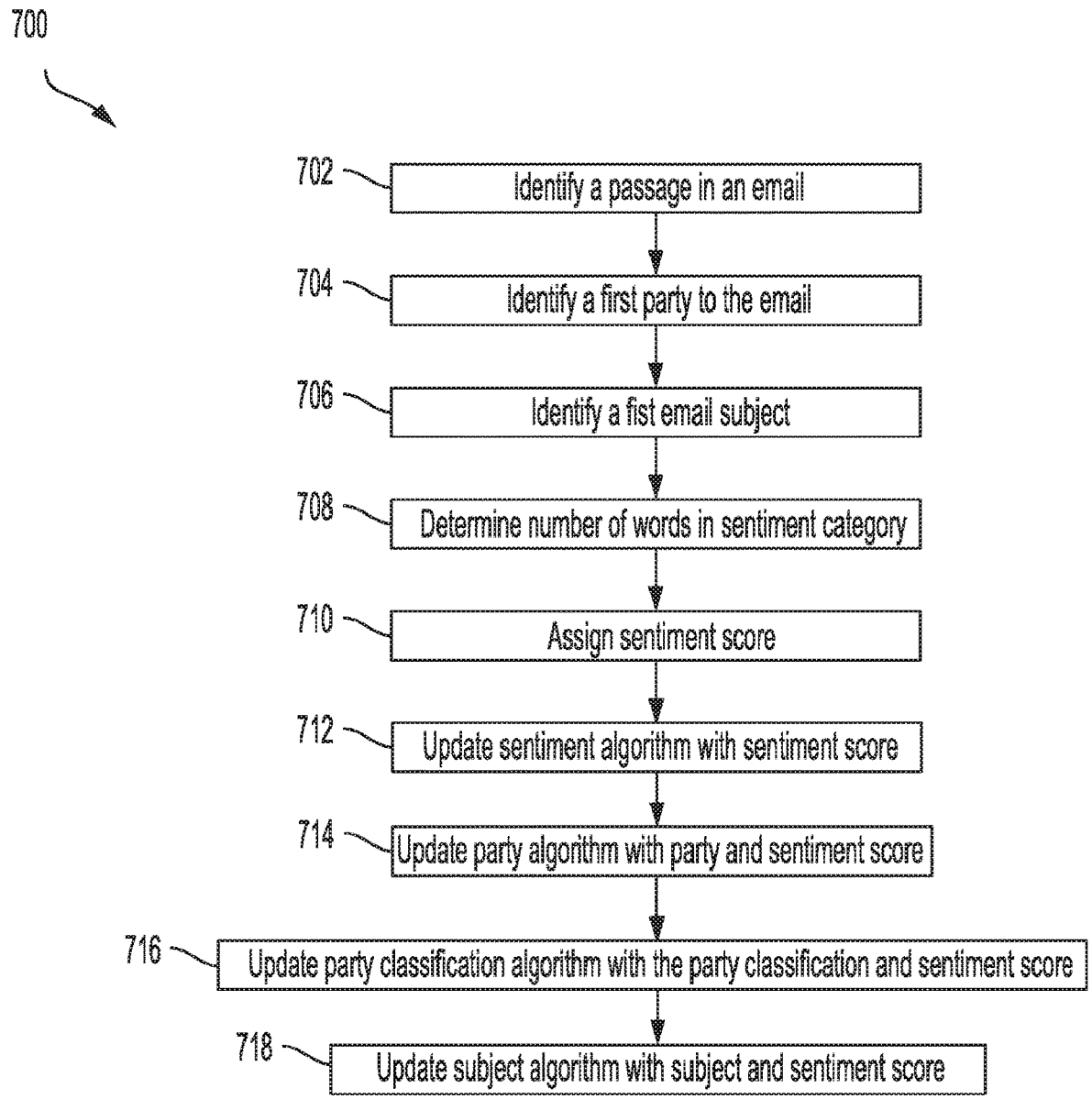
FIG. 7 illustrates an example method embodiment.

FIG. 7 depicts example method 700. At 702 a text passage may be identified within an email. At 704 the first party to the email, which may be the sender, is identified. At 706 the subject of the email may be identified. The subject may be identified by a content analyzer using natural langue processing, a key word search, a user selection, or based on the subject line of the email. At 708 the number of words that belong to a sentiment category may be determined. At 710 a sentiment score may be assigned to the passage based on the number of words in the sentiment category. At 712, the sentiment algorithm may be updated to reflect the sentiment score. The sentiment algorithm may be updated to reflect the party and subject for the sentiment score. For example, an email from a manager to an employee may read:

"Dave,

I received your analysis and it is completely absurd. Don't ever send junk like that again. Your work for the X account was much better.

—CS"

The words "Dave," "junk," "don't," and "CS" may be identified as belonging to an informal category. The words and phrases "completely" and "don't ever" may be identified as belonging in an aggressive category. The words "absurd" and "junk" may be identified as belonging in a negative category. In some embodiments a word may belong to one or more category. In other embodiments, words may be limited to a single categorization. The words "received," "analysis" "send," "like," "again," "work," and "X account" may be in a neutral category. The words "much better" may be in a positive category. Common words such as "I," "your," "and," "it," "is," or "that" may not be parsed in some embodiments. The frequent or common words may be cleaned from the email before processing.

In the above example:
the informal category may include four words/phrases: "Dave," "junk," "don't," and "CS;"
the formal category may include zero words or phrases;
the aggressive category may include two words or phrases: "absurd" and "junk;"
the negative category may include two words or phrases: "completely" and "don't ever;" and
the positive category may contain one word or phrase: "much better."

A sentiment score may be determined based on the number of words in the positive and negative sentiment category. In this example the positive/negative score may be one because there are two words or phrases in the negative category and one word or phrase in the positive category. A formal/informal score may be negative four because there are four words in the informal category and no words in the formal category.

At 714 a party algorithm may be updated to reflect the sentiment score for the party. At 716 a party classification algorithm may be updated to reflect the sentiment score for the party classification. Whereas the party may reflect an individual, the party classification may reflect a characteristic about the individual, for example the individual's job-title. At 718 a subject matter algorithm may be updated to reflect the sentiment score for the subject matter. Thus, the algorithms for determining whether sentiment is appropriate may be continually updated as new emails are generated.

Figure 8:
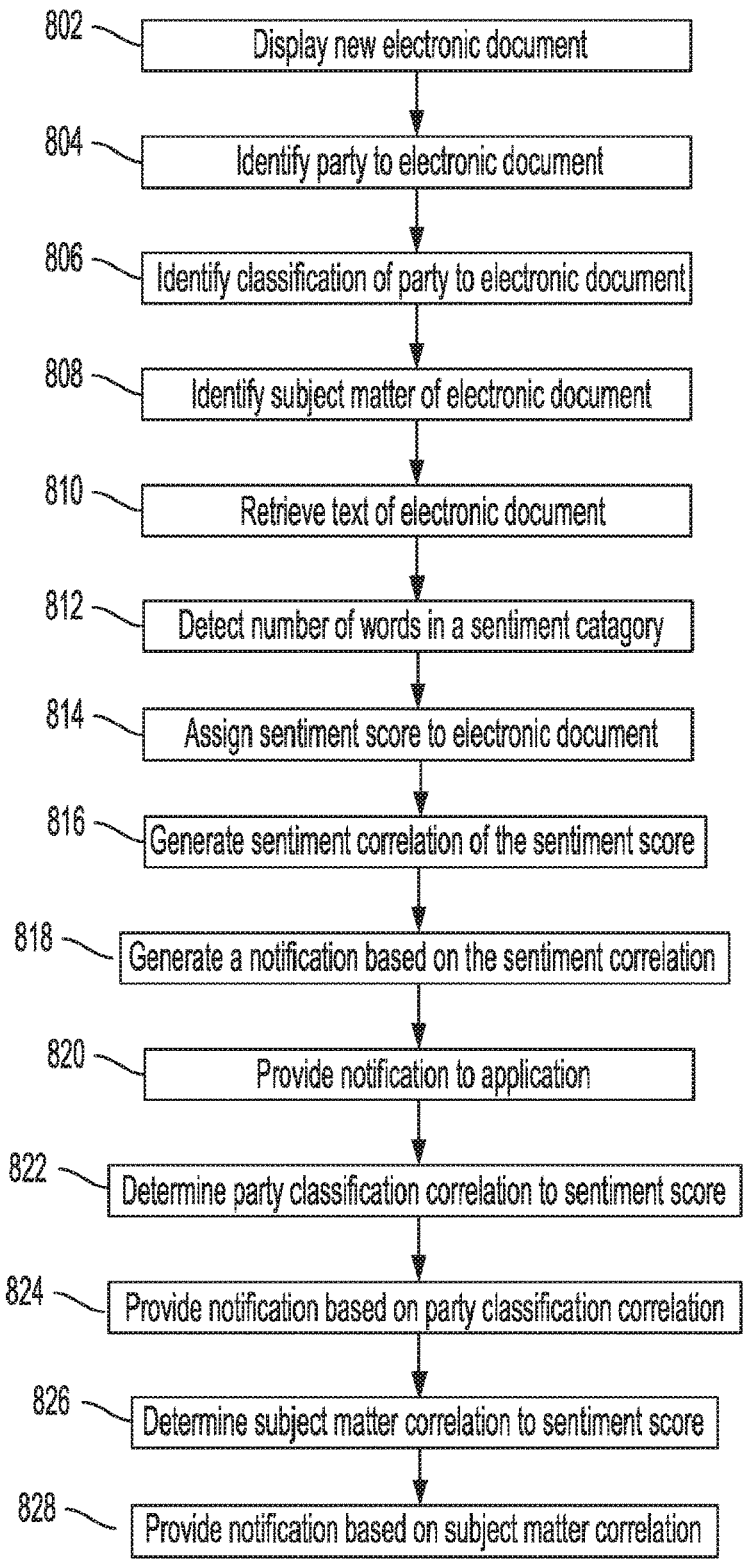
FIG. 8 illustrates an example method embodiment.

FIG. 8 depicts example method 800. At 802 a new electronic document or email may be displayed. At 804, a party to the electronic document communication may be identified. The party may be the intended recipient. At 806 the party classification may be identified. The classification may be some party characteristic, such as the relationship to the sender (i.e. client, manager, peer) or the recipient's organization. At 808 the subject matter of the electronic document may be determined. At 810, the text from the electronic document may be retrieved. At 812 the text may be analyzed. In some embodiments the text may be parsed to determine the number of words or phrases in the text that correspond to a sentiment category. The analysis may be performed with multiple sentiment categories in some embodiments. In other embodiments, an algorithm may be used to determine the sentiment of the text. At 814 the sentiment score may be assigned to the electronic document.

At 816 a correlation between the sentiment score for the document may be compared to a predetermined sentiment score. The predetermined sentiment score may be based on the sentiment score of previous communications. In other embodiments the sentiment score may be determined by the user or organization. If the correlation between the predetermined sentiment score and the electronic document's sentiment score is below a threshold, a notification that the sentiment is not appropriate may be generated at 820. A low correlation may indicate that the tone or sentiment is an outlier when compared to previous communications. At 822, the sentiment score may be compared to a sentiment score for a sender or recipient type. For example, a second sentiment score may be predetermined for emails that are from managers. In this example, a manager sentiment score may be different from a general sentiment score. A sentiment score may be predetermined for all communications within an organization, but a second sentiment score may be set for managers. For example, managers may have a higher formality sentiment score than others within the organization.

At 824 the correlation between the sentiment score of the electronic document and the party classification score may be generated. If the correlation is below a threshold, a notification may be generated indicating that the sentiment is outside of the norm for communications from senders in the sender's party classification. At 826 the correlation between the sentiment score of the electronic document and the subject matter score may be generated. If the correlation is below a threshold, a notification may be generated at 828 indicating that the sentiment is outside of the norm for emails related to the subject.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system, comprising:
   one or more processors and a memory having instructions that, when executed, cause the one or more processors to:
   extract a word from content of an electronic communication;
   assign the word a score;
   generate a communication sentiment score based on the score of the word;
   request a party sentiment score for a party to the electronic communication from a database;
   compare the party sentiment score to the communication sentiment score;
   determine a party deviation between the party sentiment score and the communication sentiment score;
   request a job-title sentiment score for a job title of the party from the database;
   compare the job-title sentiment score to the communication sentiment score;
   determine a job-title deviation between the job-title sentiment score and the communication sentiment score; and
   provide a warning to the electronic communication when the party deviation is greater than a first threshold and when the job-title deviation is greater than a second threshold.

2. The system of claim 1, wherein the instructions further cause the one or more processors to assign the word the score based on a sentiment category of the word.

3. The system of claim 2, wherein the instructions further cause the one or more processors to look up the score and the sentiment category for the word in at least one database.

4. The system of claim 2, wherein the sentiment category is aggressiveness.

5. The system of claim 2, wherein the instructions further cause the one or more processors to generate the communication sentiment score based on the sentiment category and at least one score for two or more words.

6. The system of claim 1, wherein the instructions further cause the one or more processors to remove frequently used words from the electronic communication.

7. The system of claim 1, wherein the job-title sentiment score is associated with an intended recipient of the electronic communication.

8. The system of claim 1, wherein the instructions further cause the one or more processors to invoke a machine learning model to generate the communication sentiment score.

9. The system of claim 1, wherein the instructions further cause the one or more processors to determine the party deviation based on comparing a word count in the electronic communication to a baseline word count.

10. The system of claim 1, wherein the instructions further cause the one or more processors to delay sending the electronic communication.

11. The system of claim 1, wherein the electronic communication is electronic mail.

12. A method, comprising:
    executing, on a processor, instructions that cause the processor to perform operations associated with contextual feedback, the operations comprising:
    extracting a word from content of an electronic communication;

assigning the word a score associated with sentiment;
generating a communication sentiment score based on the score of the word;
requesting a first-party sentiment score for a first party to the electronic communication from a database;
comparing the first-party sentiment score to the communication sentiment score;
determining a party deviation between the first-party sentiment score and the communication sentiment score;
requesting a job-title sentiment score for a job title of a second party to the electronic communication from the database;
comparing the job-title sentiment score to the communication sentiment score;
determining a job-title deviation between the job-title sentiment score and the communication sentiment score; and
providing a warning to the electronic communication when the party deviation satisfies a first threshold and the job-title deviation satisfies a second threshold.

13. The method of claim 12, wherein the first party and the second party are a recipient.

14. The method of claim 12, wherein the operations further comprise invoking a machine learning model to generate the communication sentiment score.

15. The method of claim 12, wherein the operations further comprise delaying sending the electronic communication.

16. The method of claim 12, further comprising assigning the score based on a sentiment category of the word retrieved from at least one database.

17. The method of claim 16, wherein the operations further comprise highlighting words in the electronic communication that correspond to the sentiment category.

18. A computer-implemented method, comprising:
extracting a word from content of an electronic communication;
determining a word sentiment score for the word;
generating a communication sentiment score based on the word sentiment score;
requesting a first-party sentiment score for a sender of the electronic communication from a database;
comparing the first-party sentiment score to the communication sentiment score;
determining a first-party deviation between the first-party sentiment score and the communication sentiment score;
requesting a second-party sentiment score of an intended recipient of the electronic communication from the database, wherein the second-party sentiment score is job-title specific;
comparing the second-party sentiment score to the communication sentiment score;
determining a second-party deviation between the second-party sentiment score and the communication sentiment score; and
providing a warning to the electronic communication when the first-party deviation satisfies a first threshold and when the second-party deviation satisfies a second threshold.

19. The computer-implemented method of claim 18, further comprising highlighting one or more words in the electronic communication that correspond to a particular sentiment category.

20. The computer-implemented method of claim 18, further comprising delay sending the electronic communication.

* * * * *